United States Patent [19]

Tapia

[11] 4,134,875
[45] Jan. 16, 1979

[54] POLYOLEFIN FILM FOR AGRICULTURAL USE

[75] Inventor: Graciano J. Tapia, Madrid, Spain

[73] Assignee: Alcudia Empresa Para la Industria Quimica, S.A., Madrid, Spain

[21] Appl. No.: 887,939

[22] Filed: Mar. 17, 1978

[51] Int. Cl.$^2$ ............................................... C08K 3/30
[52] U.S. Cl. ...................................... 260/42.46; 47/9; 260/45.7 S; 423/518
[58] Field of Search .................. 260/42.46, 45.7 S; 423/518

[56] References Cited

U.S. PATENT DOCUMENTS

| 3,252,250 | 5/1966 | Lemaire | 260/42.46 X |
| 3,592,792 | 7/1971 | Newland et al. | 260/42.46 X |
| 3,953,565 | 4/1976 | Mizutani | 260/45.7 S X |
| 4,024,087 | 5/1977 | Lainer et al. | 423/518 X |

Primary Examiner—Sandra M. Person
Attorney, Agent, or Firm—Wigman & Cohen

[57] ABSTRACT

Polyethylene or EVA copolymer film which includes up to about 15% by weight of an additive preferably a mixture of alunite - aluminum hydroxide is disclosed for particular use as a cover for agricultural purposes. The disclosed film has improved properties which provide growth of plants and/or crops by reducing thermal losses to the atmosphere and by minimizing shadow formation. The physical characteristics of the film are equal to or better than conventional films.

14 Claims, No Drawings

POLYOLEFIN FILM FOR AGRICULTURAL USE

BACKGROUND OF THE INVENTION

1. Field of the Invention

The present invention relates to polymeric compositions particularly well suited for agricultural purposes. More particularly, the present invention relates to polymeric films or sheets formulated for use as a cover material for growing plants or crops.

2. Description of the Prior Art

Conventional polymeric film such as polyethylene, copolymers of ethylene, and other polyolefins have been extensively used as cover materials for protecting crops in greenhouses and the like. Although the conventional materials have certain advantages such as low cost, light weight, etc. they also possess certain operational disadvantages which can be summarized as follows:

(a) They are permeable to long wave infra-red radiation particularly within the range of between approximately 7 and 14 microns ($7 \cdot 10^{-6}$ and $14 \cdot 10^{-6}$m) which is precisely the area of greatest transmission of the dry atmosphere. Consequently, the covers or greenhouses covered with these films lose considerable heat through radiation, particularly on clear nights when the earth and the plants act as a low temperature black body transmitter causing the phenomenon known as thermic inversion to occur. This phenomena can occur when the temperature inside the cover or greenhouse is only a few degrees lower than the temperature on the outside thereby producing frost and/or increasing the cost of the necessary energy when the cover or greenhouse is heated artificially.

(b) These films are poor light diffusers creating areas of deep shadow inside the covers or greenhouses produced by the structural support and the plants themselves.

(c) These films are permeable to ultra-violet radiation and therefore provide no protection from the harmful effect of this radiation on the plants.

In an effort to minimize certain of the aforementioned disadvantages the art has suggested the incorporation of additives such as silica, aluminum silicate or aluminum hydroxide. The following patents are noted which relate to the subject matter under consideration and of which applicant is aware:

| Patent No. | Date |
| --- | --- |
| French 1,574,088 | April 16, 1968 |
| French 2,213,954 | January 15, 1973 |
| (Patent of addition to French 1,574,088) | |
| Japanese 7213.853 | May 15, 1968 |
| Belgium 845,925 | September 9, 1975 |
| Japanese 5-1074-846 | December 18, 1974 |
| Japanese 5-0088-147 | November 8, 1973 |

By adding to polyolefin film products such as silica, aluminum silicate or aluminum hydroxide, transmittance in the area of the spectrum included between 7 and 14 microns is considerably reduced and the strength of light diffusion is increased, however, such formulations have resulted in the following drawbacks:

(a) Silica and aluminum silicates are generally very abrasive causing serious wear problems in the equipment used to formulate the composition and the later manufacture of the film.

(b) Silica and aluminum silicates have the effect of accelerating the degradation of these films.

(c) Although aluminum hydroxide presents none of the above problems, it only has an absorbing effect in wavelengths greater than 10 microns ($10 \cdot ^{-6}$m). This means that it is only really effective when mixed with silica or aluminum silicate and thus the above problems cannot be avoided.

It is also known that ethylene and vinyl acetate copolymer films (EVA copolymer) increase their absorption in the area of the spectrum included between 7 and 14 microns as the vinyl acetate content is increased but its light diffusion effect is also very low irrespective of vinyl acetate content.

OBJECTS AND SUMMARY OF THE INVENTION

The object of this invention is to provide a polymeric film which avoids the earlier problems, as aforementioned. Another object of the present invention is to provide a composition comprising at least 80%, by weight, preferably 90 to 97% polyolefin and between about 1 to about 15% by weight of an additive comprising a double basic sulfate and aluminum hydroxide. The additive is preferably present in an amount ranging from about 3 to about 10% by weight of the composition. The polyolefin can be any suitable polymer. However, polyethylene or an EVA copolymer are preferred.

The double basic sulfate can be represented by the following formula:

$$(SO_4)_4 M_6^{111} \cdot M_2^{1} \, 12 \, (OH)$$

wherein $M^{111}$ is a trivalent metal and $M^1$ is a monovalent metal. The double basic sulfate can also include some $SO_3$ or $H_2O$.

The minerals known as alunite, natroalunite, jarosite, natrojarosite etc. meet this formula. Hillebrand and Penfield give the following formula for alunite:

$$\begin{array}{c}
\text{OH} \diagdown \quad \quad \quad \quad \quad \quad \quad \quad \diagup \text{OH} \\
\quad \quad \text{Al}-\text{O}-\text{S}-\text{O}-\text{Al} \\
\text{OH} \diagup \quad \text{OH} \diagdown \quad \diagup \| \diagdown \quad \diagup \text{OH} \\
\quad \quad \quad \text{Al}-\text{O} \quad \text{O} \,\,\, \text{O} \,\,\, \text{O} \\
\text{OH} \diagup \quad \quad \quad \diagdown \text{S}-\text{O}-\text{K} \quad \text{K}-\text{O}-\text{S} \diagup \quad \diagdown \text{OH} \\
\quad \quad \quad \quad \text{O} \diagup \diagdown \quad \quad \quad \quad \diagdown \text{O}-\text{Al} \\
\quad \quad \quad \quad \quad \quad \text{O} \,\,\, \text{O} \quad \quad \quad \quad \quad \quad \diagdown \text{OH} \\
\text{OH} \diagdown \quad \diagdown \quad \| \diagup \quad \diagup \text{OH} \\
\quad \quad \text{Al}-\text{O}-\text{S}-\text{O}-\text{Al} \\
\text{OH} \diagup \quad \quad \quad \quad \quad \quad \quad \quad \diagdown \text{OH}
\end{array}$$

These compounds have great absorption in the area of the spectrum included between approximately 7 and 10 microns ($7 \cdot 10^{-6}$ and $10 \cdot 10^{-6}$m), they are insoluble in water, compatible with polyolefin and very stable in the range of temperature used in composition and manufacture of polyolefin films.

The aluminum hydroxide, $Al(OH)_3$, normally known as hydrated alumina, i.e., $Al_2O_3 \cdot 3H_2O$, provide low transmittance in the area of the spectrum included between approximately 10 and 14 microns ($10 \cdot 10^{-6}$ and $14 \cdot 10^{-6}$m).

When the additive of the present invention is incorporated into polyolefin a very low transmittance is achieved in the infra-red spectrum between 7 and 14 microns ($7 \cdot 10^{-6}$ and $14 \cdot 10^{-6}$m), which is the range that corresponds to the maximum transmission of the dry atmosphere.

The additive should be used as finely ground powder, preferably having an average particle size of between 1 and 15 microns ($1 \cdot 10^{-6}$ and $15 \cdot 10^{-6}$m).

It has been found that polyolefins containing the additive of the present invention have the following advantages over known systems based on silica, aluminum silicates or blends of both with aluminum hydroxide:

They have no adverse effect on the degradation of polyethylene and EVA copolymer films especially where the films are constantly exposed to variable weather.

They yield very little abrasive action on equipment used in the manufacture of the composition and films.

Another aspect of this invention is to include an ultra-violet radiation filter agent in the proportion of 0.05% to 2% by weight, preferably, 0.1 to 0.6% of the present composition. By partially absorbing the ultra-violet radiation, these films inhibit the adverse effect of this radiation on the plants, increasing crop growth. Among the radiation filter agents which can be used, compounds of the benzophenone family and the benzotriazoles are exemplary.

Additionally, anti-oxidants, ultra-violet stabilizers, humectants, anti-static agents, etc. can also be added to the composition of the present invention.

All previously mentioned additives can be easily incorporated into the polyolefin by conventional techniques well known in the art. One recommended procedure is to use high shear equipment, for example, Banbury type internal blenders, Buss-ko-knetter or Werner Pfleiderer type continuous blenders, etc., or mill cylinders to achieve a good dispersion of the additives with the polyolefin. Once compounded, the composition can be converted to agricultural film using any known method such as calendering, casting or, preferably, by tubular film.

Polyolefin films manufactured with the composition described herein have, among others, the following advantages:

They are quite opaque to radiation in the spectrum ranging from between 7 and 14 microns ($7 \cdot 10^{-6}$ and $14 \cdot 10^{-6}$m) which reduces heat loss from the greenhouse or cover and consequently lessens the risk of frost.

They are relatively opaque to ultra-violet radiation and this considerably reduces the adverse effect on the plants.

They are excellent light diffusers, reducing the shadow inside the greenhouse caused by the structural support and by the plants themselves.

They are highly transparent to the radiation of visible light and short wave infra-red which is fundamental in order to get the greenhouse effect.

Their mechanical strength is practically equivalent to that of the films normally used for this application made of polyolefins without fillers.

Since the starting composition can be considered non-abrasive, manufacture of the film using conventional apparatus presents no problem.

For all of the above reasons, the film of the present invention has been shown to increase the precosity of plants and crop growth when compared against polyolefin films without the additive of the present invention. Additionally, a considerable increase in productivity is achieved by this invention.

Having described the present invention in general terms the following examples are presented to more particularly describe the invention. The examples are not intended to be limiting.

EXAMPLE NO. 1

A series of compositions comprising a low density polyethylene (LDPE) with a MFI* of 0.3 gr/10 min. and up to 5% by weight combined alunite and aluminum hydroxide were formulated and placed in mill cylinders. Films having a 0.150mm thickness were manufactured by the tubular process. Measurements were taken of the following: visible light transmission; percentage of transmittance in the area of the spectrum between 1450 and 730 cm$^{-1}$ (approximately between 7 and 14 microns); percentage of transmission of the energy emitted by the black body at 10° C. in the area of the spectrum between 1450 and 730 cm$^{-1}$; this latter corresponding to that of the transparency of the dry atmosphere and between 1500 and 400 cm$^{-1}$ which is more than 90% of the total energy emitted by the black body. Additionally, light dispersion was also measured as a percentage of light transmitted and dispersed at an angle over 8° above the impinging ray.

*MFI Melting flowing index

For comparison, films prepared without any additives and with 5% silica were tested. The results are shown in Table 1.

TABLE 1

OPTICAL PROPERTIES OF VARIOUS SAMPLES OF 0.150 MM FILM

| Composition | | | | Transmittance between 1450 & 730 cm$^{-1}$ % | Transmission of energy emitted by black body at 10° C. % | | Transmission of visible light % | Dispersion of light at angle of 8° % |
|---|---|---|---|---|---|---|---|---|
| Polyethylene % | SiO$_2$ % | Alunite % | Al(OH)$_3$ % | | Between 1450 and 730 cm$^{-1}$ | Between 1500 and 400 cm$^{-1}$ | | |
| 100 | — | — | — | 72 | 72 | 78.7 | 90 | 10 |
| 95 | 5 | — | — | 25 | 23.3 | 40.9 | 84 | 55 |
| 95 | — | 5 | 36.3 | 29.2 | 30.9 | 85 | 43 | |
| 95 | — | 1 | 4 | 28.7 | 22.1 | 24.2 | 85 | 45 |
| 95 | — | 2 | 3 | 25.2 | 22.3 | 25.7 | 86 | 45 |
| 95 | — | 3 | 2 | 24.2 | 21.2 | 24.5 | 88 | 48 |
| 95 | — | 4 | 1 | 27.5 | 25.7 | 29.3 | 89 | 50 |
| 95 | — | 5 | — | 34.5 | 35.5 | 40.3 | 90 | 50 |

EXAMPLE NO. 2

To measure the abrasive effect of compositions according to the present invention various formulations containing 80% polyethylene and 20% different mineral fillers were extruded in an extruder with a special metallic part attached to the end of the screw. The abrasive effect was determined on the basis of weight loss of the metal attachment after undergoing an extrusion cycle of 500 hours. The results are as follows:

TABLE 3

| GREENHOUSE | Precosity o/LDPE (days) | Kg/Ha | Production Increase o/LDPE % | Ptas/Ha | Gross Product Increase o/LDPE % |
|---|---|---|---|---|---|
| GREEN BEAMS | | | | | |
| Greenhouse 1 | — | 5,400 | — | 362,000 | — |
| Greenhouse 2 | 6 | 6,230 | 15.4 | 474,000 | 30.9 |
| Greenhouse 3 (invention) | 14 | 7,600 | 40.7 | 603,000 | 66.6 |
| PEPPERS | | | | | |
| Greenhouse 1 | — | 18,000 | — | 598,000 | — |
| Greenhouse 2 | 6 | 26,000 | 44.4 | 907,000 | 51.7 |
| Greenhouse 3 (invention) | 16 | 33,000 | 83.3 | 1,100,000 | 83.9 |
| MARROWS (SQUASH) | | | | | |
| Greenhouse 1 | — | 73,460 | — | 557,000 | — |
| Greenhouse 2 | 7 | 85,800 | 16.8 | 665,000 | 19.4 |
| Greenhouse 3 (invention) | 15 | 89,400 | 21.7 | 798,000 | 43.3 |

Greenhouse 1 - Natural polyethylene without additives.
Greenhouse 2 - Polyethylene with 0.4% UV absorber (benzophene)
Greenhouse 3 - Polyethylene with 0.4% UV absorber (benzophene), 2.5% alunite, 2,5% Al (OH)$_3$

| Formulation (80% polyethylene with 20% additive) | Weight loss in (500 hr. cycle) |
|---|---|
| Additive | |
| 20% silica (Celite - 499) | 0.026 gr. |
| 10% Al (OH)$_3$ + 10% Alunite | 0.010 gr. |
| 20% TiO$_2$ (rutile type) (control) | 0.010 gr. |

EXAMPLE NO. 3

To measure the effect of various additives on the aging of polyolefin films, various films of (0.150 mm thick, based on LDPE with a MFI of 0.3 gr/10 min.) were prepared with 5% mineral filler but without any ultra-violet stabilizer. The films were submitted to natural aging in the sun under identical conditions. Degradation of the films was determined by the number of hours required to achieve a 0.2% level of carbonyl groups. The results which are shown in Table 2 demonstrate the superiority of the additives used in this invention against various types of silica and aluminum silicate.

TABLE 2
INFLUENCE OF VARIOUS TYPES OF ADDITIVES ON THE AGING OF POLYMERIC FILM

| Polyethylene Film With Additive | Number of hours to achieve 0.2% of Carbonyl Groups. |
|---|---|
| Additive | |
| SiO$_2$ (5% Celite 499) | 670 |
| SiO$_2$ (5% Sorbsil 644) | 600 |
| SiO$_2$ (5% MIN-U-SIL) | 630 |
| Aluminum silicate (5%) | 400 |
| Alunite (5%)* | 1730 |
| Alunite (2.5%) + Al (OH)$_3$(2.5%)* | 1500 |
| *Present Invention | |
| CONTROL | |
| Polyethylene without additives | 1580 |

EXAMPLE NO. 4

To determine the effect on plants, three agronomically identical greenhouses were constructed with a surface of approximately 500 m$^2$. The greenhouses were covered with (a) natural polyethylene films without additives (Greenhouse 1), (b) polyethylene with 0.4% of an ultra-violet light absorber of the benzophenone type (Greenhouse 2), and (c) a film according to this invention containing 3% alunite, 2% Al(OH)$_3$ and 0.4% ultra-violet absorber (Greenhouse 3). Temperature, precosity and production of various types of plants and profitability of the greenhouses were recorded. The results are shown in Table 3.

The average minimum temperatures were approximately 2° C. higher in Greenhouse 3 than in Greenhouses 1 and 2. The mechanical strength of the films was in all cases sufficiently good to withstand winds of up to 100 Km/hour.

While this invention has been described in detail with particular reference to preferred embodiments thereof, it will be understood that variations and modifications can be effected within the spirit and scope of the invention as described hereinbefore and as defined in the appended claims.

What is claimed:

1. Polymeric composition especially well suited for agricultural use comprising from about 80% or more polyolefin and from about 1% to about 15% by weight of an additive referred to as a basic metallic sulfate and having the formula

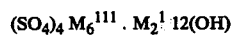

$$(SO_4)_4 \, M_6^{III} \cdot M_2^{I} \, 12(OH)$$

wherein
M$^I$ is a monovalent metal,
M$^{III}$ is a trivalent metal,
said film having low thermal transmittance properties between 7 and 14 micron wavelengths and excellent light diffusion properties.

2. The polymeric composition as defined in claim 1 wherein said polyolefin is polyethylene or copolymers of ethylene.

3. The polymeric composition as defined in claim 1 wherein said additive also includes aluminum hydroxide.

4. The polymeric composition as defined in claim 1 wherein said basic metallic sulfate is alunite.

5. The polymeric composition as defined in claim 1 wherein said additive comprises a mixture of alunite and aluminum hydroxide (or hydrated alumina) which together is present in an amount ranging from 3% to 10% by weight.

6. The polymeric composition as defined in claim 5 wherein said polyolefin is polyethylene which is present in an amount ranging from 90% to 97% by weight.

7. The polymeric composition as defined in claim 5 wherein said polyolefin is an ethylene-vinyl acetate copolymer which is present in an amount ranging from 90% to 97% by weight.

8. The polymeric composition as defined in claim 3 wherein the ratio of basic metallic sulfate and aluminum hydroxide ranges from about 4:1 to about 1:4.

9. The polymeric composition as defined in claim 1 formed as film or sheet material.

10. The polymeric composition as defined in claim 3 formed as a film or sheet material.

11. Polymeric film for covering plants or crops comprising polyethylene or copolymers thereof with an effective amount of basic metallic sulfate having the formula:

$$(SO_4)_4 M_6^{111} M_2^1 \; 12(OH)$$

wherein $M^1$ is a monovalent metal, $M^{111}$ is a trivalent metal, for imparting to said film low thermal transmittance properties between 7 and 14 microns and excellent light diffusion properties.

12. The polymeric film of claim 11 further including aluminum hydroxide admixed with said basic metallic sulfate, said combined additive being present in an amount up to 20% by weight of said film.

13. A composition according to claim 3 further including from about 0.05 to about 2% by weight of an ultra-violet absorber such as benzophenone or benzotriazole.

14. A polymeric film according to claim 12 further including from about 0.05 to about 2% by weight of an ultra-violet absorber such as benzophenone or benzotriazole.

* * * * *